March 17, 1942. H. F. GEORGE 2,276,477
STEERING WHEEL
Filed Feb. 2, 1938 3 Sheets-Sheet 1
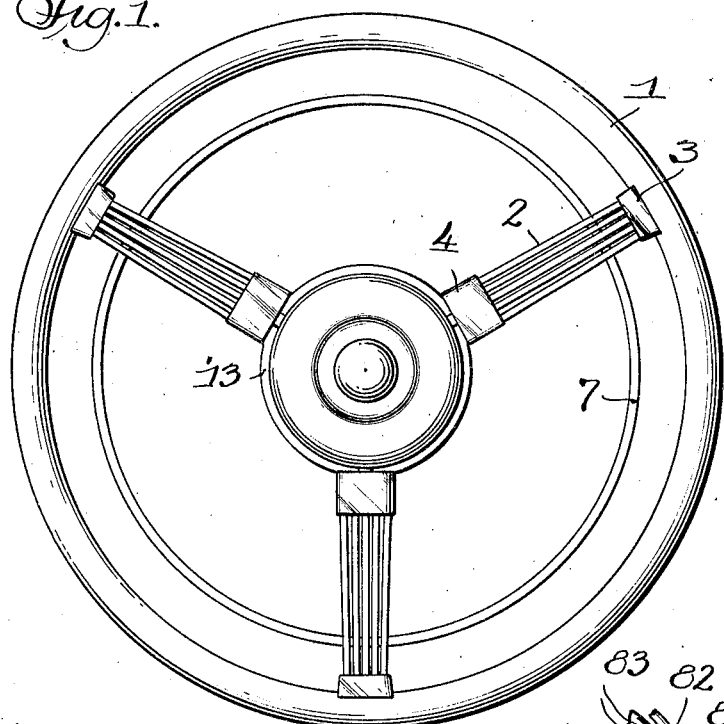
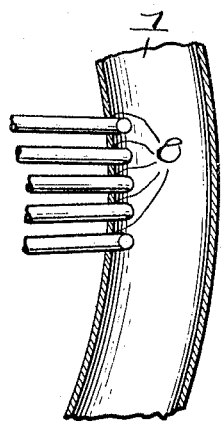
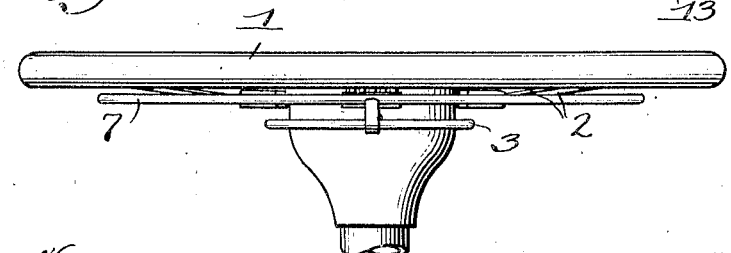
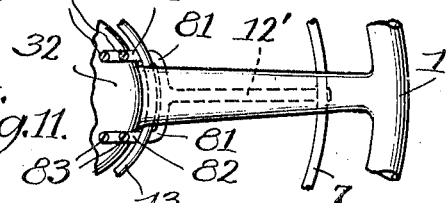
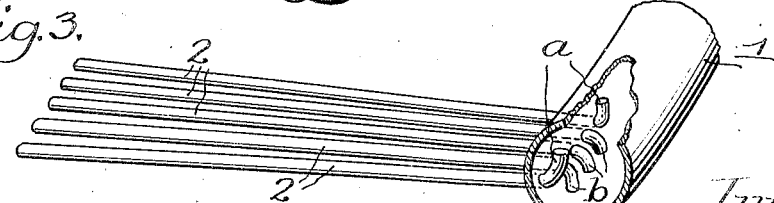
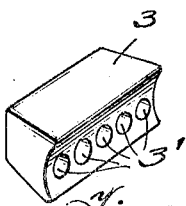
Inventor,
Harry F. George
By Parkinson & Lane, Attys.

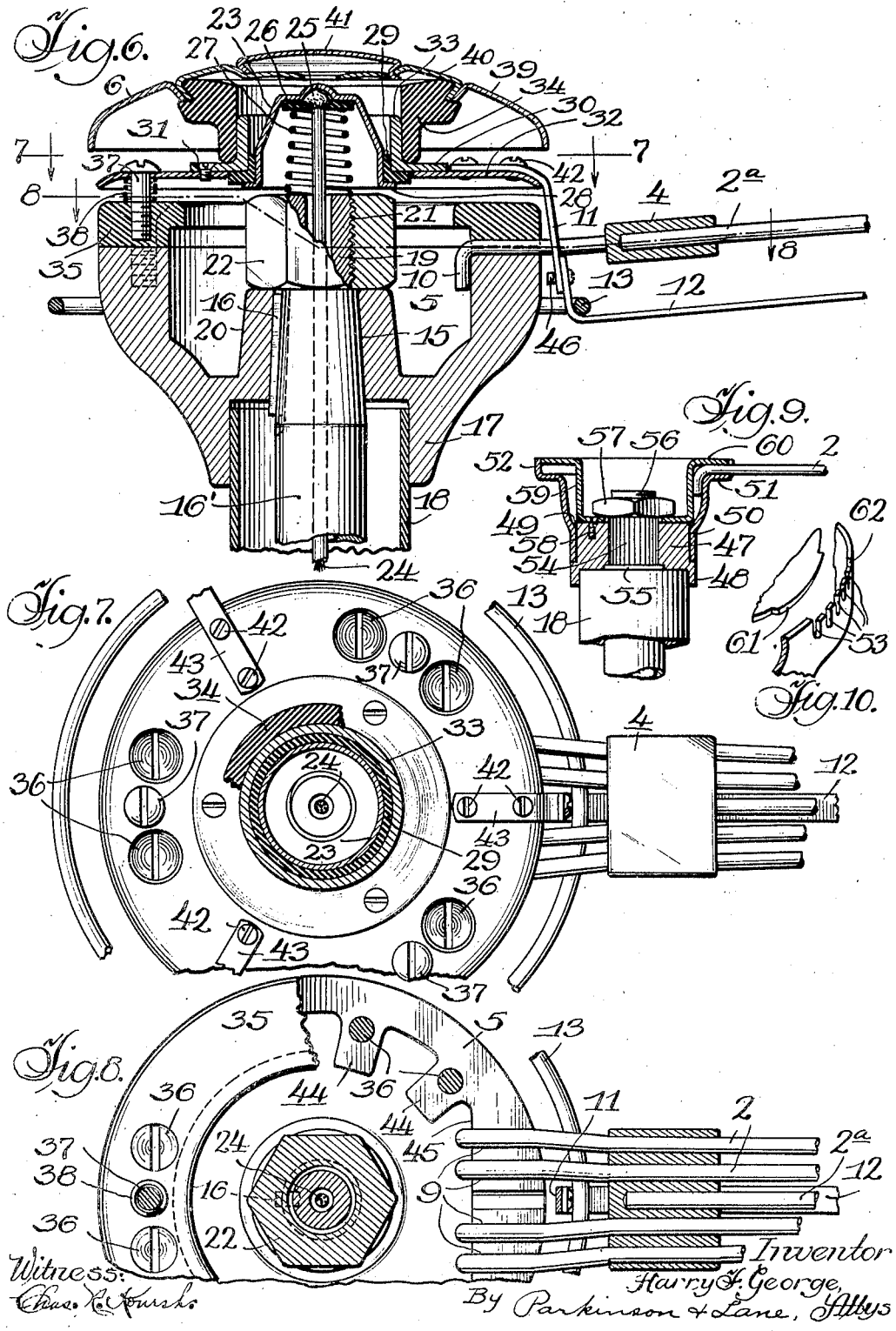

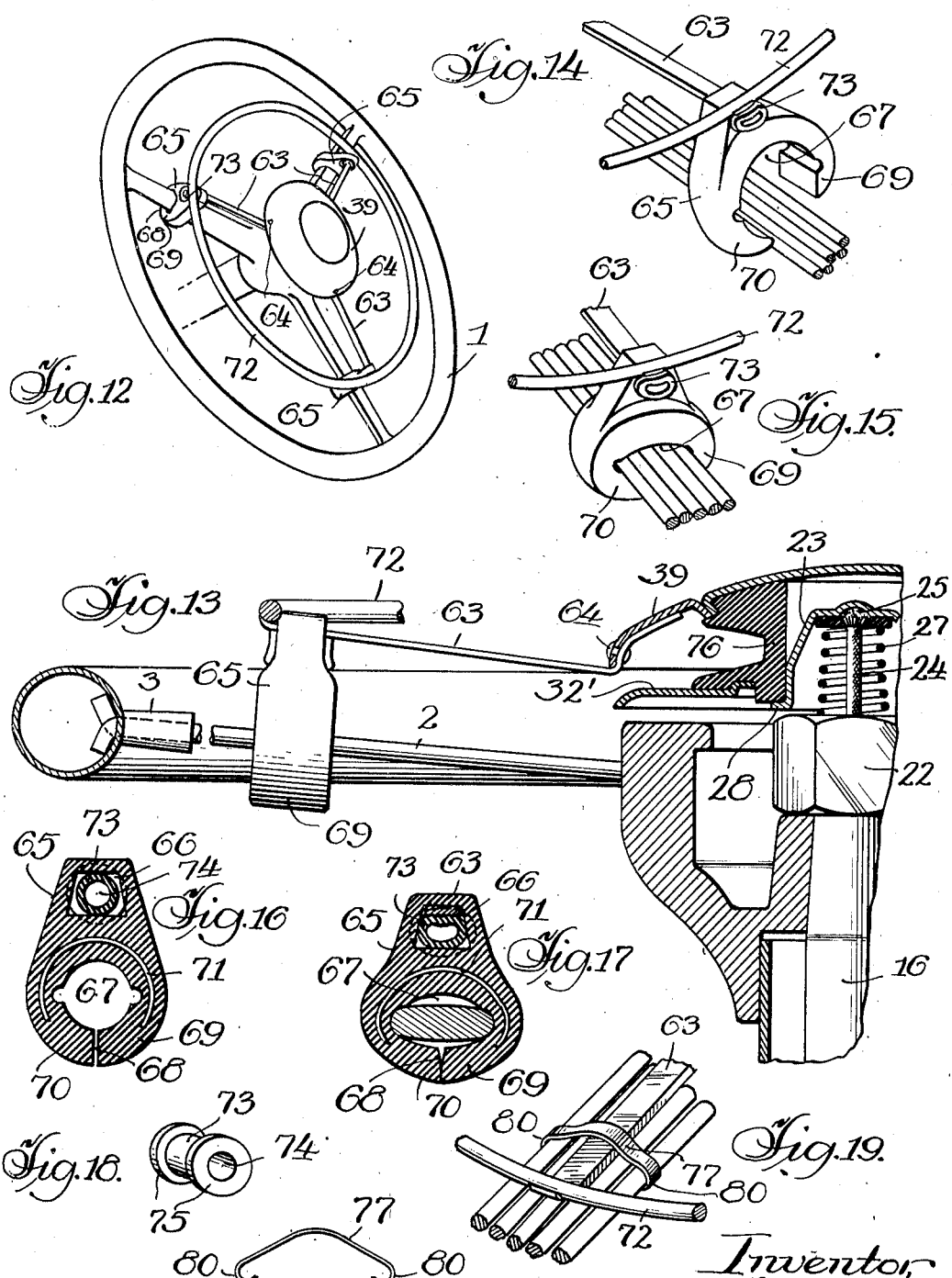

Patented Mar. 17, 1942

2,276,477

UNITED STATES PATENT OFFICE 2,276,477

STEERING WHEEL

Harry F. George, Chicago, Ill.

Application February 2, 1938, Serial No. 188,212

15 Claims. (Cl. 74—484)

This invention relates to steering wheels for automobiles and the like, and provides for a steering wheel of improved construction and greater desirability both in operation as well as ornamental appearance and economy.

Among the objects of my invention is to provide a steering wheel of improved construction, and one that is provided with novel means for more easily and quickly operating the blowing of the horn.

Another object is to provide a steering wheel having a novel arrangement of spring steel wire spokes and novel means for securing them to the rim and hub.

A further object is to provide novel means for resiliently supporting the horn blowing ring in a position for easy operation.

A still further object is to improve the hub construction and associated parts.

Another object is to provide a novel type of supporting block adapted for ready attachment to spokes of either the spring wire or the solid type for supporting the horn ring.

A further object is to provide a resilient insert in said blocks to yield when the horn ring is moved for blowing the horn.

Other objects, advantages and capabilities inherent in my invention will later more fully appear.

My invention further resides in the combination, construction and arrangement of parts illustrated in the accompanying drawings and while I have shown therein preferred embodiments, I wish it understood that the same are susceptible of modification and change without departing from the spirit of my invention.

In the drawings:

Fig. 1 is a top plan view of a steering wheel embodying my invention.

Fig. 2 is a side elevation of the wheel of Fig. 1 and fragmentarily showing the upper end portion of the steering jacket.

Fig. 3 is a fragmentary perspective view of a portion of the rim and showing the spring wire spokes as unbent at the hub end and bent at the rim end and inserted into corresponding holes in the rim, some of said bent ends being turned one way and some the other to more securely hold them in place.

Fig. 4 is a fragmentary transverse horizontal central section through the rim and showing the bent ends of the spring wire spokes in place therein.

Fig. 5 is a perspective view of one of the spoke fittings for the outer end of the spokes.

Fig. 6 is a vertical central section through the hub, adjacent portions of the horn control ring, horn button mechanism, upper end of the steering post and jacket and adjacent end of one of the spring wire spokes.

Fig. 7 is a fragmentary transverse section taken on the line 7—7 of Fig. 6.

Fig. 8 is a fragmentary transverse section taken on the line 8—8 of Fig. 6.

Fig. 9 is a fragmentary vertical central section through a modified form of hub formed from stamped or pressed metal instead of being cast.

Fig. 10 is a fragmentary perspective view of an edge portion of the form of hub shown in Fig. 9.

Fig. 11 is a fragmentary top plan view of a solid or single spoke and a small adjacent portion of each of the rim and the horn blowing plate with a modified form of horn control rim connection.

Fig. 12 is a perspective view of a steering wheel having a modified form of horn control ring and means for detachably connecting the same with wheel spokes of the solid type.

Fig. 13 is a fragmentary vertical section of a steering wheel of the type shown in Fig. 12, except that the spokes in Fig. 13 are of spring steel wire instead of solid.

Fig. 14 is a fragmentary perspective view of a portion of a spoke of the spring steel wire type and showing the horn control ring support opened up and just being applied thereto.

Fig. 15 is a view similar to Fig. 14 but showing the horn control ring support fully applied to the steel spring wires of the spokes.

Fig. 16 is a vertical transverse section through one of the horn ring supports of Fig. 12 before it is opened up for applying to the spoke.

Fig. 17 is a view similar to Fig. 16 but after being applied to the spoke arm.

Fig. 18 is a perspective view of the rubber grommet forming a resilient seat in the block.

Fig. 19 is a fragmentary perspective view of the spring steel wire spokes with a radial arm of the horn ring fastened thereto with a removable clip.

Fig. 20 is a front elevation of one of the clips for removably securing the horn ring arms to the wire spokes.

Referring in detail to the drawings, the assembled steering wheel in its preferred form is shown in Figs. 1 to 8 and is of the dished wheel type. It comprises in general the rim 1, the spring wire spokes 2, the spoke fittings 3 and 4, the hub 5, composite horn button 6 and horn control ring 7. At appropriately spaced points the rim is formed with openings 8 to receive the outer ends of the spokes 2 which ends have previously been bent as shown in Figs. 3 and 4. These bent ends may be inserted in their respective hole by being hooked therethrough as the spokes are moved angularly to the rim. After said ends have been inserted through said holes, any number (preferably two) of the spokes of each set are rotated through 180° to bring their bent ends *a* to extend in the opposite direction to the remaining bent ends *b* (see Fig. 3) to further insure their being positively held in place when the assembling is completed.

The spoke fitting 3, which is formed with a number of openings 3' corresponding in number and size to the wire spokes 2, is next slipped over the spokes to the position shown in Fig. 1. The other spoke fitting 4, which is likewise formed with openings of a number and size to receive said spokes, is then slipped over the spokes, the openings in spoke fitting 4 being somewhat farther spaced apart than those in fitting 3 so as to cause the spokes to diverge from each other as they approach the center of the wheel (see Fig. 1). When each of the three sets of spokes are thus assembled, the inner ends of the spokes of all of the three or more sets are then laid in the grooves 9 in the hub 5 (or in similar grooves in a steel die) and bent downwardly by a suitable die or the like, to form the bent ends 10, see Fig. 6. If a separate steel die is used for bending said ends, the spokes are then transferred from the die to the hub and pressed down into the hub and grooves 9. This draws the spokes 2 taut with relation to both the hub and rim. The spoke fittings 3 and 4 are then caused to grip one or more of the spokes by being upset by a prick punch or the like, at a point to cause the upset to grip the spoke or spokes.

The rim, as well as any other parts desired, are either before or after assembly covered with a decorative coating of composition plastic material, enamel, or other desirable ornamental finish or covering as desired.

In order to provide an opening between the hub and spoke fitting 4 through which the upwardly extending portion 11 of the arm 12 of the horn control ring 7 may extend I preferably, in the form shown in Figs. 1 to 8, make the central spoke wire 2*a* shorter than the others and do not extend its corresponding hole entirely through spoke fitting 4 as shown in Figs. 6 and 8. At the juncture of the portion 11 and arm 12 and above the latter, I provide a reinforcing ring 13 to give added strength to these parts.

The hub 5 is fixed by means of the tapered portion 15 and key 16 to the upper end of the tubular steering post 16', and also has the annular flange 17 which fits over the upper end of the steering jacket 18. This provides for rotation of the steering post upon rotation of the steering wheel. The upper end 19 of the steering post extends a distance above the tapered portion 15 and above the top of the upstanding annular flange 20, this extension being formed with screw threads 21 to receive the correspondingly threaded nut 22 which is screwed down tightly against the top of the flange 20 and holds the tapered upper end of the steering post tightly in its seat in the hub.

Extending through the inside of the tubular steering post from suitable connection with the battery up to the metal contact washer 23 is the insulated wire 24 which is soldered at 25 to said contact washer or otherwise secured thereto so as to be in conducting contact therewith. Below said solder connection 25 and contacting with the under face of the top of contact washer 23 is an insulating washer 26 against which presses the top of compression coil spring 27 which at its bottom bears against nut 22 and normally holds contact washer 23 in an elevated position away from contact with nut 22 and insulated from spring 27. As shown said contact washer flares outwardly and downwardly and at its lower edge is formed with the marginal flange 28 upon which rests the annular insulating ring 29 (preferably rubber) which as shown in Fig. 6 is L-shaped in cross section and forms a seat for the annular ring member 30 which is fixedly secured by screws or the like 31 to the plate 32 and is also formed with the upstanding collar or annular flange 33 which together with the base 30 forms a seat for the rubber insulating ring 34.

For firmly clamping the inner ends of the spoke wires 2 within the grooves 9 in the hub, there is provided a hub cap ring 35 which is rigidly secured to the hub by a plurality of screws 36, and which hub cap ring is preferably formed with complemental grooves in its lower face to seat snugly over the adjacent upper surfaces of the inner ends of spoke arms 2. Screwed into the upper surface of hub cap ring 35 are a plurality of circumferentially spaced screws 37, preferably 3 in number, which pass through registering holes in the plate 32 and whose heads are above said plate. Surrounding each of said last mentioned screws is a coil spring 38 held under compression between the upper surface of the hub cap ring and the under face of plate 32 which springs thereby normally hold said plate in its uppermost position against the heads of said screws 37. Secured to the upper portion of the insulating ring 34 is a horn button cover 39 which may have the inner ornamental ring 40 and plate 41 suitably decoratively finished as desired.

Suitably fixed by screws, rivets or the like 42 to plate 32 are the upper bent ends 43 of the portions 11 of the horn control ring arms 12 which are normally held in the position shown in Fig. 6 until the ring 7, which is below the spokes 2, is pulled or forced upwardly at any point in its circumference by pressure from the fingers or thumb of the operator's hands grasping the steering wheel. While for convenience I have in Figs. 6, 7, 8 and 9 only indicated one set of spokes it is to be understood that there will be provided three sets of such spokes as shown in Fig. 1, each set being constructed and arranged alike, hence the above description will apply to all three of them. The inwardly extended ribs or lugs 44 on the inner portion of hub 5 afford additional material for the screw holes for screws 36 as well as facilitate formation of the straight edge or face 45 to receive and hold the downturned inner ends 10 of the spokes 2.

From the above construction it will be seen that an upward pull on any circumferential point of the horn control ring 7 will tilt the plate 32 by reason of the plate on the near side to the pull being fulcrumed about the lower face of the nearest one or two heads of screws 37 which in turn will force downwardly the opposite side of the plate 32 and compress the spring 38 on the far side until the lower edge of the metal contact washer contacts the metal nut 22 and completes the electric circuit to the chassis and causes the horn to sound regardless of what circumferential point of the ring 7 is moved upwardly. The horn will also be caused to sound by a similar action when a downward thrust is exerted on any circumferential or near-circumferential portion of the horn button cover 39, 40, 41, or said button pushed straight down bodily to compress spring 27 and springs 38 and bring the lower end of contact washer 23 into contact with nut 22 to complete the circuit. The lower end of arm 11 and the upturned inner end of arm 12 may be secured together by a screw or the like 46 to facilitate assembly.

In Fig. 9 is shown another form of hub arrangement which comprises the collar 47 formed at its lower edge with the marginal flange 48 which extends downwardly over the upper edge of the steering jacket 18. The outer surface of the collar 47 is knurled or roughened as shown at 49 in order that when the outer hub shell 50 (which will also be knurled or roughened on the inside if desired) is pressed thereover it will be tightly gripped thereon. The outer hub shell 50 is preferably stamped from steel or other suitable metal and is flared outwardly toward its upper end and formed with the outwardly extending portion 51 which at its outer edge is formed with the upstanding marginal flange 52 having the notches 53 formed therein (see Fig. 10) to receive the inner ends of the spokes 2, the ends 19 of the latter being bent downwardly within the hub shell 50 in a manner similar to that described above in connection with Figs. 6 and 8, the outer hub shell being suitably held in a die during this operation if desired.

As shown in Fig. 9 the reduced upper end of the steering post passes through collar 47 and is knurled or roughened at 54 to have a tight engagement with the collar when these two parts are forced together. This reduced upper end of the steering post is at its lower end just above the top of the steering jacket formed with a shoulder 55 to act as a stop for collar 47 so that it will not jam against the upper end of said jacket. The top portion of this reduced upper end of the steering post is formed with screw threads 56 to receive the nut 57. Secured to the top of collar 47 by screws 58 or the like is the bottom of the inner hub shell 59 which in addition to being held by screws 58 is also tightly clamped between the lower face of the nut 57 and the upper face of collar 47 when said nut is tightened. Said inner hub shell 59 is at its upper end formed with the horizontally and outwardly extending annular portion 60 the marginal edge of which at points where the spokes enter the hub is formed with the outwardly extending ears 61 each of which ears fits into a seat or notch 62 of corresponding shape formed at corresponding places in the edge flange 52 of the outer hub shell just above the spoke receiving notches 53 as will be understood in Figs. 9 and 10. As a result of these ears and notches the top face 60 of the inner hub shell 59 will be flush with the upper edge of the flange 52. While in Figs. 9 and 10 only one set of spokes is shown, it will be understood that any number of such spoke sets may be provided for in a similar manner as desired. In this form the spoke fittings may be either used or omitted as desired.

In Figs. 12 to 18 is shown a further modification in which the horn control ring is mounted above the steering wheel spokes instead of below them as in the preceding figures. In the form of Figs. 12–18 the control ring arms 63 are secured by screws, rivets or the like 64 to the under face of the horn button cover member 39 and at their outer ends these arms each pass through an opening 66 in a rubber claw 65 which claw in its lower portion is formed with a larger opening 67 which due to the slit 68 in the bottom of the claw can be opened up to a larger size and the finger portions 69 and 70 spread apart so as to be passed over the spoke of the steering wheel which spoke may either be a plurality of spring wires as shown in Figs. 1 to 9 and 13 to 15 or solid spokes as shown in Fig. 12. Embedded within the body of the rubber claws 65 is a spring member 71 normally tending to close fingers 69 and 70 and hold them together except when forced apart, thus insuring that when opened up as in Fig. 14 and then passed over the spoke they will when released close and grip the spoke as shown in Fig. 15.

The outer ends of the horn control ring arms 63 are soldered, brazed, welded or otherwise rigidly secured to the horn control ring 72 which will occupy a position just outside of the claws 65 as shown. Also mounted in each of the openings 66 of claws 65 is a rubber grommet 73 of the form shown in Fig. 18, it having an opening 74 extending through its length and formed on each end with a flange 75 to hold the grommet in place within opening 66. These grommets are made of rubber sufficiently pliable that, while they will normally remain in distended position and hold the arms 63 in their upper position, they will yield when pressure is applied downwardly at any point on the horn control ring and permit downward movement of arms 63 which will in turn tilt the horn button to bring the bottom edge 28 of the contact washer 23 into contact with the nut 22 and close the circuit and blow the horn in a manner similar to that described above in connection with Figs. 6–8. When the pressure on the horn control ring is released the grommets will distend and move the arms 63 upwardly thus breaking the contact referred to and stopping the blowing of the horn. This form shown in Figs. 12–18 as is seen comprises a device of the character described which may be sold separately and immediately applied to a car by removing the old horn button cover and associated parts, and slipping the new assembly into place by slipping the rubber annular horn button 76 over the contact washer 23 and into engagement with the plate 32' which corresponds in general construction and operation to plate 32 in Fig. 6, and then attaching the claws 65 to the spokes as described.

In the form shown in Figs. 19 and 20 there are substituted for the claws 65 and the grommets 73, the clips 77 which are bowed upwardly at their middle portion to receive and provide sufficient room for the arms 63 of control ring 72, and are formed at their outer ends with the hook portions 80 adapted to be sprung outwardly and when released hook over the two sides of the group of wire spokes forming the steering wheel arm and held in place thereon. In this form the arms 63 and associated parts will be set with enough springiness that they will normally stand in their uppermost position within the limits of the upstanding center of the clips 77 but when pressed downwardly will cause contact of the contact washer 23 and the nut 22 and blow the horn, and when released will break the contact and stop the blowing of the horn.

In Fig. 11 I have shown another arrangement of connection between the horn control ring arm 12' and plate 32 capable of application below a solid spoke without having to cut an opening through the spoke for the arm to pass up through. In this form the arm 12' is extended in both directions at its inner end to form the extensions 81 which after passing beneath the stiffening ring extend upwardly in the form of prongs 82 and from thence pass over the top of the plate 32 to which they are rigidly secured by screws, bolts, rivets or the like 83 so as to tilt this plate to blow the horn in a manner similar to that described above in connection with Fig. 6.

Having described my invention, I claim:

1. In a steering wheel, a hub, a plurality of sets of spokes, each set of spokes comprising a plurality of individual spring wire rods each having an angularly bent outer end, a hollow tubular rim having a plurality of sets of apertures adapted to receive said bent ends, some of said bent ends being turned in said apertures in a direction opposite to the direction of the remainder of said bent ends, said hub comprising a pair of spaced hub shells, the inner ends of each of said spokes being angularly bent in the same direction and clamped between the adjacent faces of said hub shells.

2. In a steering wheel, a hub, a plurality of sets of spokes, each set of spokes comprising a plurality of individual spring wire rods each having an angularly bent outer end, a hollow tubular rim having a plurality of sets of apertures adapted to receive said bent ends, some of said bent ends being turned in said apertures in a direction opposite to the direction of the remainder of said bent ends, said rods being taut endwise to draw said bent ends into close engagement with the inside of said tubular rim, said hub comprising a pair of spaced hub shells, the inner ends of each of said spokes being angularly bent in the same direction and clamped between the adjacent faces of said hub shells.

3. In a steering wheel, a hub, a plurality of sets of spokes, each set of spokes comprising a plurality of individual spring wire rods each having an angularly bent outer end, a hollow tubular rim having a plurality of sets of apertures adapted to receive said bent ends, some of said bent ends being turned in said apertures in a direction opposite to the direction of the remainder of said bent ends, said hub having a plurality of grooves to receive the inner ends of said spokes, said hub comprising a pair of spaced hub shells, the inner ends of each of said spokes being angularly bent in the same direction and clamped between the adjacent faces of said hub shells.

4. In a steering wheel, a hub, a plurality of sets of spokes, each set of spokes comprising a plurality of individual spring wire rods each having an angularly bent outer end, a hollow tubular rim having a plurality of sets of apertures adapted to receive said bent ends, some of said bent ends being turned in said apertures in a direction opposite to the direction of the remainder of said bent ends, the inner ends of said spokes being bent inwardly into said hub in such manner as to create a longitudinal tension in said spokes to hold said spokes taut between the rim and hub, said hub comprising a pair of spaced hub shells, the inner ends of each of said spokes being angularly bent in the same direction and clamped between the adjacent faces of said hub shells.

5. In a steering wheel, a hub, a plurality of sets of spokes, each set of spokes comprising a plurality of individual spring wire rods each having an angularly bent outer end, a hollow tubular rim having a plurality of sets of substantially parallel apertures adapted to receive said bent ends, some of said bent ends being turned in said apertures in a direction opposite to the direction of the remainder of said bent ends, said hub comprising a female hub shell and a male hub shell, one of said shells having a plurality of recesses to receive the inner end portions of said spokes, the inner ends of said spokes being bent inwardly into said female hub shell and clamped between the adjacent faces of said hub shells in such manner as to create a longitudinal tension in said spokes to hold said spokes taut between the rim and hub.

6. In a steering wheel, a hub, a plurality of sets of spokes, each set of spokes comprising a plurality of individual spring wire rods each having an angularly bent outer end, a hollow tubular rim having a plurality of sets of substantially parallel apertures adapted to receive said bent ends, some of said bent ends in each set being turned in said apertures in a direction opposite to the direction of the remainder of said bent ends, said hub comprising a pressed metallic female hub shell and a pressed metallic male hub shell, the inner ends of said spokes being bent downwardly into said female hub shell into contact with the inner surface thereof, the male hub shell being forced downwardly into the female hub shell tightly against the bent inner ends of the spokes to hold said spokes taut between the rim and the hub.

7. In a steering wheel, a hub, a plurality of sets of spokes, each set of spokes comprising a plurality of individual spring wire rods each having an angularly bent outer end, a hollow tubular rim having a plurality of sets of substantially parallel apertures adapted to receive said bent ends, some of said bent ends in each set being turned in said apertures in a direction opposite to the direction of the remainder of said bent ends, said hub comprising a pressed metallic female hub shell and a pressed metallic male hub shell, the inner ends of said spokes being bent downwardly into said female hub shell into contact with the inner surface thereof, the male hub shell being forced downwardly into the female hub shell tightly against the bent inner ends of the spokes to hold said spokes taut between the rim and the hub, said female hub shell having an upstanding circumferential flange having a plurality of sets of notches corresponding in location to the inner end portions of the spokes and receiving the latter, the male hub shell having an outwardly extending top positioned over said sets of notches to clamp said spokes in said notches.

8. In a steering wheel, a hub, a plurality of sets of spokes, each set of spokes comprising a plurality of individual spring wire rods each having an angularly bent outer end, a tubular rim having a plurality of sets of apertures adapted to receive said bent ends, some of said bent ends being turned in said apertures in a direction opposite to the direction of the remainder of said bent ends, a horn button, and a horn control ring for controlling said button, said control ring being below the spokes and having arms extending upwardly between the spokes to the horn button above the spokes.

9. In a steering wheel, a hub, a plurality of sets of spokes, each set of spokes comprising a plurality of individual spring wire rods each having an angularly bent outer end, a tubular rim having a plurality of sets of apertures adapted to receive said bent ends, some of said bent ends being turned in said apertures in a direction opposite to the direction of the remainder of said bent ends, a horn button, and a horn control ring for controlling said button, said horn control ring being cooperatively associated with said spokes and said hub, the horn button being above the level of the spokes and the control ring being below the spokes.

10. In a steering wheel, a hub, a tubular rim, a plurality of spring wire spokes extending between said rim and hub, means for holding said spokes taut between said rim and hub and above the same, a horn button on said hub, a horn control ring, and arms connecting said ring and said button, said arms passing from above to below said spokes, the control ring being below the spokes.

11. In a steering wheel, a hub, a rim, spring wire spokes tightly held between said hub and rim, said hub comprising a stamped outer shell and a stamped inner shell, the outer shell having notches in its upper marginal edge to receive the inner end of said spokes, said inner shell having an outwardly extending top portion which holds said spoke inner ends in said notches, the outer upper edge of the outer shell being substantially flush with the upper face of said top portion.

12. In a steering wheel, a hub, a rim, spokes connecting said hub and rim, horn control mechanism mounted on said hub, a horn control ring, arms connecting said ring with said control mechanism, and detachable resilient means for resiliently mounting said ring on said spokes, said detachable resilient means being made of rubber and each having resilient feet that may be spread apart and passed over said spokes and come together to grip said spokes.

13. In a steering wheel, a hub, a rim, spokes connecting said hub and rim, horn control mechanism mounted on said hub, a horn control ring, arms connecting said ring with said control mechanism, and detachable resilient means for resiliently mounting said ring on said spokes, said detachable resilient means being made of rubber and each having resilient feet that may be spread apart and passed over said spokes and come together to grip said spokes, and a resilient grommet in each of said detachable resilient means for resiliently supporting said arms.

14. In a steering wheel, a hub, a plurality of sets of spokes, each set of spokes comprising a plurality of individual spring wire rods each having an angularly bent outer end, a tubular rim having a plurality of sets of apertures adapted to receive said bent ends, some of said bent ends being turned in said apertures in a direction opposite to the direction of the remainder of said bent ends, mechanism for opening and closing horn blowing connections, and a horn control for moving said mechanism, said control being below the spokes and having arms extending upwardly between the spokes to the horn blowing mechanism above the spokes.

15. In a steering wheel, a hub, a plurality of sets of spokes, each set of spokes comprising a plurality of individual spring wire rods each having an angularly bent outer end, a tubular rim having a plurality of sets of apertures adapted to receive said bent ends, some of said bent ends being turned in said apertures in a direction opposite to the direction of the remainder of said bent ends, a horn button, a horn control means for controlling said button, said horn control means being cooperatively associated with said spokes and said hub, the horn button being above the level of the spokes and the horn control means being below the spokes, and means extending from above the level of the spokes to below the level of the spokes to operatively connect the horn button and the horn control means.

HARRY F. GEORGE.